United States Patent [19]
Mehta

[11] 3,982,626
[45] Sept. 28, 1976

[54] BELT ELEVATOR FOR BULK MATERIAL
[75] Inventor: Bharat C. Mehta, Belleville, Canada
[73] Assignee: Allis-Chalmers Corporation, Milwaukee, Wis.
[22] Filed: June 5, 1975
[21] Appl. No.: 584,135

[52] U.S. Cl. .............................................. 198/626
[51] Int. Cl.² ......................................... B65G 15/14
[58] Field of Search ....................... 198/165, DIG. 2

[56] References Cited
FOREIGN PATENTS OR APPLICATIONS
1,123,345   9/1956   France ................................ 198/165
  647,597  11/1928   France ................................ 198/165

*Primary Examiner*—Evon C. Blunk
*Assistant Examiner*—Douglas D. Watts
*Attorney, Agent, or Firm*—Charles L. Schwab

[57] ABSTRACT

A bulk material handling apparatus especially adapted for handling granular material wherein a pair of flexible belts are arranged about drive and idler pulleys to provide a material receiving run of one belt, a first transition zone where the pair of belts have edge-to-edge contact in a path curving from horizontal to vertical as defined by a plurality of edge rolls, a vertical change of elevation zone where the belts are held in face-to-face contact by opposed sets of edge rollers, a second transition zone and a material delivery run where the material is discharged at a different level. The edge rollers and rolls of the elevation and transition zones have parallel axes and cylindrical belt engaging surfaces whereby the belt edges are maintained in parallel, face-to-face contact and smoothly transfer between the zones without entrapping the elevated bulk material between the edges.

8 Claims, 4 Drawing Figures

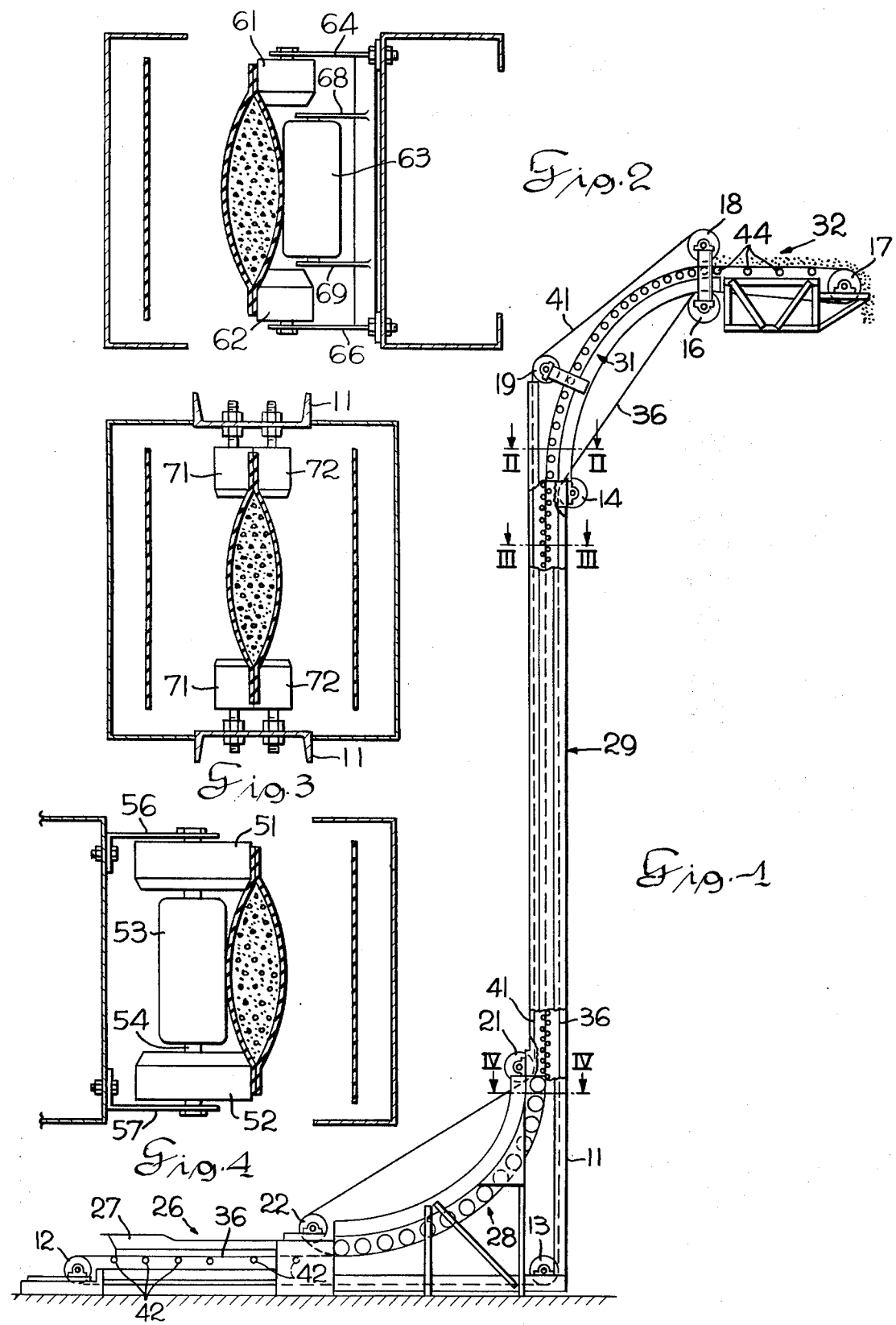

BELT ELEVATOR FOR BULK MATERIAL

RELATED APPLICATIONS

The present invention is disclosed in copending U.S. Pat. application Ser. No. 564,433, filed Apr. 2, 1975.

BACKGROUND OF THE INVENTION

Heretofore, others have provided elevators for bulk materials which employ a pair of engaging belts which hold the material therebetween as it is elevated from one level to another. One such belt elevator is shown in U.S. Pat. No. 3,805,946 issued Apr. 23, 1974 to Earl W. Yateman, Anthony D. Janitsch and Warren R. Vaughan on a conveyor apparatus. In this prior belt elevator, each set of troughing rolls, includes a central roller and a pair of slanting side rolls whose axes diverge toward the central roller. As the diverging edges of the troughed belt come into engagement with the edges of the cooperating belt, they are angularly disposed in relation to edges of the cooperating belt. This tends to permit bulk material to move into the space between the edges prior to the edges being brought into sealing engagement in the elevating portion of the belt elevator, thus interferring with proper sealing of the belt edges. Also heretofore, it has been suggested that the elevating portion of a belt elevator includes substantially vertically disposed engaging belts. In copending U.S. Pat. application Ser. No. 564,434, filed Apr. 2, 1975, a belt elevator is shown wherein the vertically disposed belt portions in the elevating zone are urged toward one another by fluid pressure. In copending U.S. Pat. application Ser. No. 564,431, filed Apr. 2, 1975, the confronting portions of the belts in the elevating zone of a belt elevator are disposed within a pressurized fluid plenum and opposed edge rollers are additionally provided to assist in holding the belt edges in sealing engagement. In order to efficiently elevate a required volume of known bulk material by a vertical belt elevator, it has been found desirable to use upper and lower transition zones above and below the vertical elevating zone, the upper and lower transition zones including rollers defining a curved path which changes the direction of the belts from horizontal to vertical and from vertical to horizontal. It has also been found desirable in such an elevator to employ staggered edge rollers in the elevating zone of the type disclosed and claimed in copending U.S. Pat. application Ser. No. 564,432, filed Apr. 2, 1975, so as to more effectively seal the belt edges. However, the prior art troughing roller arrangement for the transition zones permitted some bulk material to be captured between the belt edges and this material would tend to remain between the edges as they pass between the opposed staggered edge rollers in the elevation zone. If the bulk material trapped between the confronting belt edges is significantly large, the sealing relationship between the belts may be ineffective and material may escape.

THE INVENTION

According to this invention, there is provided in a bulk handling apparatus especially adapted to transport granular material between different levels, a pair of flexible belts having a change of elevation zone in which the belts are in face-to-face relationship with their edges held in sealing engagement by opposed sets of edge rollers and upper and lower transition zones above and below the elevation zones.

The transition zones include edge rolls mounted on parallel axes, which axes are also parallel to the axes of the edge rollers in the elevation zone. Each edge roll and roller has a cylindrical belt engaging surface and thus when the belts pass from one transition zone to the elevation zone and from the latter to the other transition zone, the belt edges remain in face-to-face contact so as to minimize the opportunity for conveyed material to work its way between the belt edges.

BRIEF DESCRIPTION OF THE DRAWINGS

FIG. 1 is a side view of a belt elevator incorporating the present invention;

FIG. 2 is a section view taken along the line II—II in FIG. 1;

FIG. 3 is a section view taken along the line III—III in FIG. 1; and

FIG. 4 is a section view taken along the line IV—IV in FIG. 1.

DETAILED DESCRIPTION OF THE INVENTION

The belt elevator illustrated in FIG. 1 includes a suitable frame 11 on which belt pulleys 12, 13, 14, 16, 17, 18, 19, 21 and 22 are rotatably supported on parallel axes. The elevator includes a loading zone 26 where a feeding hopper 27 is located, a lower transition zone 28, a change of elevation zone 29, an upper transition zone 31 and a discharge zone 32. A first flexible belt 36 is carried by the pulleys 12, 13, 14, 16 and 17 and a second flexible belt 41 is carried by pulleys 18, 19, 21 and 22. In the load receiving zone 26, a plurality of rollers 42 support the belt 36 and in the discharge zone 32 a plurality of rollers 44 support the belt 36. In the lower transition zone the belts 36, 41 are supported, as shown in FIG. 4, by a plurality of circumferentially spaced sets of rollers, each set having a pair of edge rolls 51, 52 and a central load or thrust roller 53. The rolls 51, 52 and roller 53 are rotatably mounted on a stationary shaft 54 by suitable bearings, not shown, and the shaft 54 is mounted on brackets 56, 57 secured to the frame 11. In the upper transition zone 31 the belts 36 and 41 are supported by a plurality of sets of circumferentially spaced rollers, each set including a pair of edge rolls 61, 62 and a central load or thrust roller 63. The edge rolls 61, 62 are rotatably mounted on brackets 64, 66 secured to the elevator frame 11 and the central roller 63 is rotatably mounted on a pair of brackets 68, 69 on the frame 11. In the elevation change zone 29, confronting runs of belts 41, 36 are held in contact with one another by sets of edge rollers 71, 72 rotatably mounted on the frame 11 in staggered relation to one another. These rollers are more fully described in copending U.S. Pat. application, Ser. No. 564,432, filed Apr. 2, 1975, entitled "Belt Elevator With Staggered Edge Rollers."

The illustrated elevator does not employ fluid pressure means to hold the belts in contact with one another and with the material being elevated. The rollers 71, 72 are the sole means for maintaining the belts in engagement with one another in the elevation zone. This is made possible by providing belts with sufficient lateral stiffness and resiliency to exert the proper amount of force against the material being elevated. Such a belt is disclosed in copending U.S. Pat. application Ser. No. 564,433, filed Apr. 2, 1975. The cross-section of the material being conveyed can be controlled by the design or adjustment of the feeding hopper 27.

It should be understood that this belt elevator can be used to lower material as well as elevate material, and in either usage the belts, because of their lateral stiffness, will exert sufficient force against the material to cause the material to move in a uniform manner. The belts will flex to accommodate some changes in the cross-section of material being conveyed but still exert the necessary force to keep the material in column form in the change of elevation zone 29. Although the material retains its granular form in the change of elevation zone 29, the force of the belts cause it to act like a substantially integral mass.

The lateral flexibility of the belts is such that as the volume of the column of material in the change of elevation zone 29 increases to cause greater flexing of the belts, the belts will automatically assert greater force against the material to hold the larger column in a relatively rigid form. This self-adjusting feature permits the belts to efficiently move loose bulk material with only edge rollers in the change of elevation zone 29 to hold the belts in edge contact with one another. The expense of an air plenum for the elevating zone of a belt elevator is avoided. Support rollers for the central parts of the belts in the elevating zone are not required and the functional problems and expense connected therewith are avoided.

By providing edge rolls 51, 52 or 61, 62 which have cylindrical belt edge engaging surfaces and are mounted on parallel axes rather than a diverging axes, the belt edges stay in face-to-face sealing engagement as they move between the transition zones 28, 31 and the elevation zone 29. This minimizes opportunity for conveyed material to become entrapped between the belt edges. If the prior art angularly disposed side rollers of conventional troughing roller arrangements were used, the laterally opposite edges of the belt would be disposed in diverging relation to one another in the transition zones whereas the laterally opposite belt edges in the elevation zone are coplanar. Thus, in moving from a transition zone to the elevation zone, or vice-versa, the belt edges would necessarily change their side-to-side inclination. Such shifting of inclination of the belt edges tends to permit infiltration of conveyed material between the belt edges destroying the seal therebetween and permitting loss of material. The present invention keeps the belt edges moving at the same side-to-side inclination as they transfer from one transition zone to the elevation zone and from the elevation zone to the other transition zone.

In the illustrated embodiment of this invention, the belts curve smoothly in 90° arcs in both the upper and lower transition zones and follow a substantially vertical path through the elevation zone. The cylindrical belt engaging surfaces of the thrust rollers 53, 63 are spaced radially inwardly from the edge rolls 51, 52, 61, 62 in relation to the 90° transition curves of the transition zones so that the belt on the inside of the curve may trough to facilitate conveyance of bulk material. In other words, the cylindrical surfaces of the thrust rollers engage the belts on the inside of the curves defined by the edge rolls 51, 52, 61, 62.

The embodiments of the invention in which an exclusive property or privilege is claimed are defined as follows:

1. In a belt elevator for bulk material of the type having a frame, a receiving zone and a discharge zone, the combination comprising:

belt pulleys mounted on said frame, a pair of normally flat flexible belts of substantially uniform thickness cooperatively engaging said pulleys and disposed in cooperative confronting engagement with one another in an elevation zone, and in upper and lower curved transition zones, said belts being laterally flexible to accommodate changes in volume of material conveyed thereby, sets of opposed edge rollers rotatably mounted on said frame disposed on parallel transverse axes having radially outward facing cylindrical surfaces urging the confronting faces of the edges of said belts into sealing engagement in said elevation zone, two laterally spaced series of edge rolls rotatably mounted on said frame in said lower transition zone circumferentially spaced from one another all on parallel transverse axes to define a first gradual curve, said edge rolls having radially outer cylindrical surfaces engaging the laterally opposite edges of the belt on the inside of said first curve, a series of thrust rollers rotatably mounted on said frame disposed in circumferentially spaced relation to one another and bearing against the central portion of the belt on the inside of said first curve, two laterally spaced series of edge rolls rotatably mounted on said frame in said upper transition zone circumferentially spaced from one another all on parallel transverse axes to define a second gradual curve, said edge rolls having radially outer cylindrical surfaces engaging the laterally opposite edges of the belt on the inside of said second curve, and a series of thrust rollers rotatably mounted on said frame disposed in circumferentially spaced relation to one another and bearing against the central portion of said first belt, said edge rolls and said edge rollers having parallel axes and providing a smooth face-to-face transfer of said belt edges between said edge rolls of said transition zones and said edge rollers of said elevation zone.

2. The belt elevator of claim 1 wherein said belts move vertically in said elevation zone.

3. The belt elevator of claim 1 wherein said belts follow a 90° curve in each of said transition zones.

4. The belt elevator of claim 1 wherein said cylindrical surfaces of said thrust rollers are disposed inside the curves defined by said edge rolls.

5. In a belt elevator for bulk material of the type having a frame, a receiving zone and a discharge zone, the combination comprising:

belt pulleys mounted on said frame, a pair of normally flat flexible belts of substantially uniform thickness cooperatively engaging said pulleys and disposed in cooperative confronting engagement with one another in an elevation zone and in a curved transition zone, said belts being laterally flexible to accommodate changes in volume of material conveyed thereby, sets of opposed edge rollers rotatably mounted on said frame disposed on parallel transverse axes having radially outward facing cylindrical surfaces urging the confronting faces of the edges of said belts into sealing engagement in said elevation zone, two laterally spaced series of edge rollers rotatably mounted on said frame in said transition zone circumferentially spaced from one another all on parallel transverse axes to define a gradual curve, said edge rolls having radially outer cylindrical surfaces engaging the laterally opposite edges of the belt on the inside of said curve, and a series of thrust rollers rotatably mounted on said frame disposed in circumferentially spaced relation to one another and bearing against the central portion of the belt on the inside of said curve, said edge rolls and said edge rollers having parallel axes and providing a smooth face-to-face transfer of said belt edges between said edge rolls of said transition zone and said edge rollers of said elevation zone.

6. The belt elevator of claim 5 wherein said belts move vertically in said elevation zone.

7. The belt elevator of claim 5 wherein said belts follow a 90° curve in said transition zone.

8. The belt elevator of claim 5 wherein said cylindrical surfaces of said thrust rollers are disposed inside the curve defined by said edge rolls.

* * * * *